(12) United States Patent
Francis, Jr. et al.

(10) Patent No.: US 9,117,267 B2
(45) Date of Patent: Aug. 25, 2015

(54) SYSTEMS AND METHODS FOR MARKING IMAGES FOR THREE-DIMENSIONAL IMAGE GENERATION

(71) Applicant: Google Inc., Mountain View, CA (US)

(72) Inventors: Anthony Gerald Francis, Jr., San Jose, CA (US); Thor Lewis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/958,776

(22) Filed: Aug. 5, 2013

(65) Prior Publication Data

US 2014/0112573 A1    Apr. 24, 2014

Related U.S. Application Data

(60) Provisional application No. 61/715,363, filed on Oct. 18, 2012.

(51) Int. Cl.
 *G06K 9/00* (2006.01)
 *G06T 7/00* (2006.01)
 *G01B 11/25* (2006.01)

(52) U.S. Cl.
 CPC .......... *G06T 7/0024* (2013.01); *G01B 11/2513* (2013.01); *G06T 7/0065* (2013.01); *G01B 2210/52* (2013.01)

(58) Field of Classification Search
 None
 See application file for complete search history.

(56) References Cited

U.S. PATENT DOCUMENTS

| | | | |
|---|---|---|---|
| 5,461,478 A | 10/1995 | Sakakibara et al. | |
| 6,341,016 B1 | 1/2002 | Malione | |
| 6,664,531 B2 | 12/2003 | Gartner et al. | |
| 7,164,789 B2 | 1/2007 | Chen et al. | |
| 7,200,262 B2 | 4/2007 | Sawada | |
| 7,978,925 B1 * | 7/2011 | Souchard | 382/254 |
| 8,090,194 B2 | 1/2012 | Golrdon et al. | |
| 8,098,275 B2 | 1/2012 | Keating, III et al. | |
| 8,208,719 B2 | 6/2012 | Gordon et al. | |

(Continued)

FOREIGN PATENT DOCUMENTS

| | | |
|---|---|---|
| WO | 02/086420 A1 | 10/2002 |
| WO | 2011/120526 A1 | 10/2011 |

OTHER PUBLICATIONS

Perkin Elmer 1100 Series FX-1160 data sheet, 2001, 2 pages.*

(Continued)

*Primary Examiner* — Chan Park
*Assistant Examiner* — Mai Tran
(74) *Attorney, Agent, or Firm* — McDonnell Boehnen Hulbert & Berghoff LLP

(57) ABSTRACT

Methods and systems for image marking and generation of a three-dimensional (3D) image of an object are described. In an example, a computing device may be configured to receive a first set of images of an object that capture details of the object. The computing device may also be configured to receive a second set of images that include markings projected on the object and that are indexed to correspond to images of the first set of images. The computing device may be configured to spatially align images of the second set of images based on the markings projected on the object and determine respective images of the first set of images corresponding to spatially aligned images of the second set of images. The computing device may then generate a 3D image of the object from the respective images of the first set of images.

22 Claims, 11 Drawing Sheets

(56) References Cited

U.S. PATENT DOCUMENTS

| | | |
|---|---|---|
| 2002/0006217 A1* | 1/2002 | Rubbert et al. ............... 382/131 |
| 2002/0141614 A1* | 10/2002 | Lin ............................... 382/103 |
| 2003/0002016 A1 | 1/2003 | Sellen et al. |
| 2003/0066949 A1* | 4/2003 | Mueller et al. ............. 250/208.1 |
| 2003/0160970 A1 | 8/2003 | Basu et al. |
| 2003/0175024 A1 | 9/2003 | Miyoshi et al. |
| 2004/0222987 A1 | 11/2004 | Chang et al. |
| 2005/0283065 A1* | 12/2005 | Babayoff ...................... 600/407 |
| 2006/0210146 A1 | 9/2006 | Gu |
| 2006/0268153 A1 | 11/2006 | Rice et al. |
| 2007/0009859 A1* | 1/2007 | Preston et al. .................. 434/11 |
| 2007/0046663 A1 | 3/2007 | Brinkmann et al. |
| 2008/0123937 A1* | 5/2008 | Arias Estrada et al. ....... 382/154 |
| 2008/0232679 A1 | 9/2008 | Hahn et al. |
| 2008/0246757 A1 | 10/2008 | Ito |
| 2009/0097039 A1 | 4/2009 | Kawasaki et al. |
| 2009/0324135 A1* | 12/2009 | Kondo et al. ................. 382/284 |
| 2010/0215250 A1 | 8/2010 | Zhu |
| 2012/0063672 A1 | 3/2012 | Gordon et al. |
| 2014/0028805 A1 | 1/2014 | Tohme |

OTHER PUBLICATIONS

Website: Autodesk 123D Catch. www.123dapp.com/catch, 2013.
Non-Final Office Action mailed Nov. 26, 2012 in U.S. Appl. No. 13/594,911, 7 pages.
Final Office Action mailed Mar. 5, 2013 in U.S. Appl. No. 13/594,911, 12 pages.
Official Action issued in connection with Co-Pending U.S. Appl. No. 13/594,911, dated Oct. 22, 2014, 19 pages.
Notice of Allowance in Co-Pending U.S. Appl. No. 13/594,911, dated Mar. 12, 2015, 7 pgs.

* cited by examiner

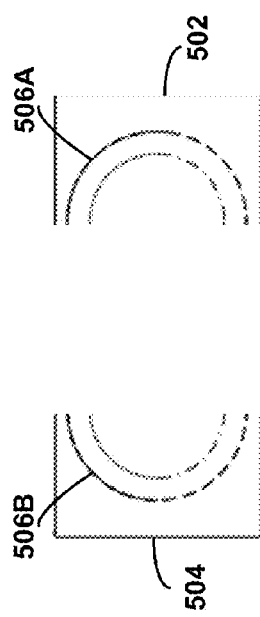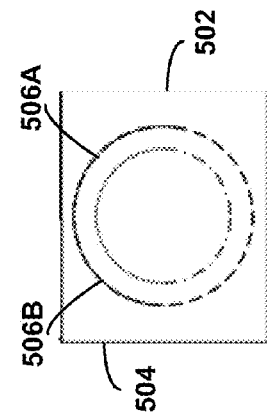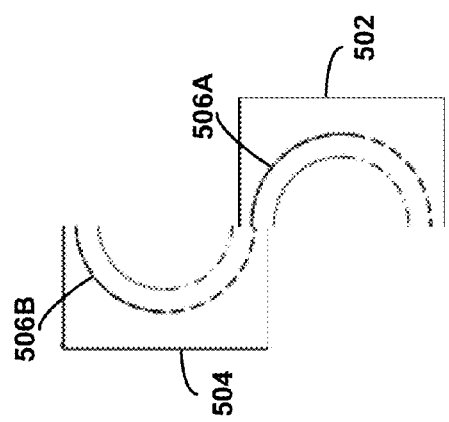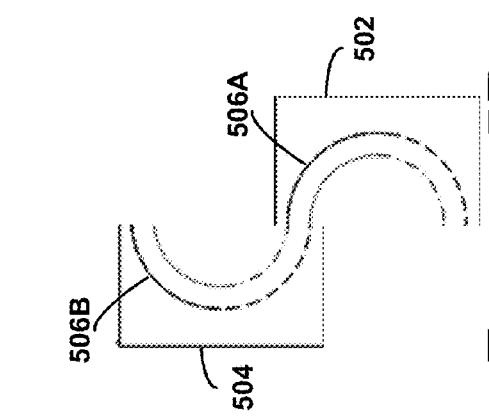

COMPUTER PROGRAM PRODUCT 800

SIGNAL BEARING MEDIUM 801

PROGRAM INSTRUCTIONS 802

- RECEIVING, AT A COMPUTING DEVICE, A FIRST SET OF IMAGES OF AN OBJECT, WHEREIN IMAGES OF THE FIRST SET OF IMAGES ARE CAPTURED FROM RESPECTIVE ANGLES WITH RESPECT TO THE OBJECT

- RECEIVING A SECOND SET OF IMAGES OF THE OBJECT, WHEREIN IMAGES OF THE SECOND SET OF IMAGES ARE CAPTURED FROM THE RESPECTIVE ANGLES WITH RESPECT TO THE OBJECT AND ARE INDEXED SUCH THAT EACH IMAGE OF THE SECOND SET OF IMAGES CORRESPONDS TO A RESPECTIVE IMAGE OF THE IMAGES OF THE FIRST SET OF IMAGES, AND WHEREIN THE IMAGES OF THE SECOND SET OF IMAGES ARE CAPTURED WHILE A PATTERN IS PROJECTED ON THE OBJECT

- MATCHING PORTIONS OF THE PATTERN IN EACH IMAGE OF THE SECOND SET OF IMAGES TO CORRESPONDING PORTIONS OF THE PATTERN IN SPATIALLY NEIGHBORING IMAGES OF THE SECOND SET OF IMAGES SO AS TO SPATIALLY ALIGN THE IMAGES OF THE SECOND SET OF IMAGES

- DETERMINING RESPECTIVE IMAGES OF THE FIRST SET OF IMAGES CORRESPONDING TO SPATIALLY ALIGNED IMAGES OF THE SECOND SET OF IMAGES, BASED ON INDEXING OF THE IMAGES OF THE SECOND SET OF IMAGES TO THE IMAGES OF THE FIRST SET OF IMAGES

- GENERATING A THREE-DIMENSIONAL (3D) IMAGE OF THE OBJECT BASED ON THE RESPECTIVE IMAGES OF THE FIRST SET OF IMAGES DETERMINED TO CORRESPOND TO THE SPATIALLY ALIGNED IMAGES OF THE SECOND SET OF IMAGES

| COMPUTER READABLE MEDIUM 803 | COMPUTER RECORDABLE MEDIUM 804 | COMMUNICATIONS MEDIUM 805 |
|---|---|---|

FIGURE 8

SYSTEMS AND METHODS FOR MARKING IMAGES FOR THREE-DIMENSIONAL IMAGE GENERATION

CROSS REFERENCE TO RELATED APPLICATION

The present application claims priority to U.S. Provisional patent application Ser. No. 61/715,363, filed on Oct. 18, 2012, and entitled "Systems and Methods for Marking Images for Three-Dimensional Image Generation," which is herein incorporated by reference as if fully set forth in this description.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

The present application discloses systems and methods for marking images for three-dimensional (3D) image generation. In one aspect, a method is described. The method may comprise receiving, at a computing device, a first set of images of an object. Images of the first set of images may be captured from respective angles with respect to the object. The method may also comprise receiving a second set of images of the object. Images of the second set of images may be captured from the respective angles with respect to the object and may be indexed such that each image of the second set of images corresponds to a respective image of the first set of images. The images of the second set of images may be captured while a pattern is projected on the object. The method may further comprise matching portions of the pattern in each image of the second set of images to corresponding portions of the pattern in spatially neighboring images of the second set of images so as to spatially align the images of the second set of images. The method may also comprise determining respective images of the first set of images corresponding to spatially aligned images of the second set of images, based on indexing of the images of the second set of images to the images of the first set of images. The method may further comprise generating a 3D image of the object based on the respective images of the first set of images determined to correspond to the spatially aligned images of the second set of images.

In another aspect, a non-transitory computer readable medium having stored thereon instructions executable by a computing device to cause the computing device to perform functions is described. The functions may comprise receiving a first set of images of an object. Images of the first set of images may be captured from respective angles with respect to the object. The functions may also comprise receiving a second set of images of the object. Images of the second set of images may be captured from the respective angles with respect to the object and may be indexed such that each image of the second set of images corresponds to a respective image of the first set of images. The images of the second set of images may be captured while a pattern is projected on the object. The functions may further comprise matching portions of the pattern in each image of the second set of images to corresponding portions of the pattern in spatially neighboring images of the second set of images so as to spatially align the images of the second set of images. The functions may also comprise determining respective images of the first set of images corresponding to spatially aligned images of the second set of images, based on indexing of the images of the second set of images to the images of the first set of images. The functions may further comprise generating a 3D image of the object based on the respective images of the first set of images determined to correspond to the spatially aligned images of the second set of images.

In still another aspect, a system is described. The system may comprise a marking module that may be configured to project on an object markings that depict a pattern. The system may also comprise an image capturing module configured to receive a first set of images of the object. Images of the first set of images may be captured from respective angles with respect to the object. The image capturing module may also be configured to receive a second set of images of the object. Images of the second set of images may be captured from the respective angles with respect to the object and may be indexed such that each image of the second set of images corresponds to a respective image of the first set of images. The images of the second set of images may be captured while the pattern is projected on the object. The system may further comprise an image generation module coupled to the image capturing module and configured to match given portions of the pattern in each image of the second set of images to corresponding portions of the pattern in spatially neighboring images of the second set of images so as to spatially align the images of the second set of images, the image generation module may be configured to determine respective images of the first set of images corresponding to spatially aligned images of the second set of images, based on indexing of the images of the second set of images to the images of the first set of images, and the image generation module may be configured to generate a 3D image of the object based on the respective images of the first set of images determined to correspond to the spatially aligned images of the second set of images.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5A illustrates an example of two images including the markings, in accordance with an embodiment.

FIGS. 5B-5D illustrate example iterations of image alignment, in accordance with an embodiment.

FIG. 8 is a schematic illustrating a conceptual partial view of an example computer program product that includes a computer program for executing a computer process on a computing device, arranged according to at least some embodiments presented herein.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

This disclosure may disclose methods and systems for image marking and generation of a three-dimensional (3D) image of an object. In an example, a computing device may be configured to receive a first set of images of high resolution of an object to capture details of the object. The computing device may also be configured to receive a second set of images of lower resolution that include markings projected on the object and that are indexed to correspond to images of the first set of images (e.g., each image of the second set of image may correspond to a respective image of the first set of images). The computing device may be configured to spatially align images of the second set of images based on the markings projected on the object and determine respective images of the first set of images corresponding to spatially aligned images of the second set of images. The computing device may then generate a 3D image of the object from the respective images of the first set of images.

Figure 1:
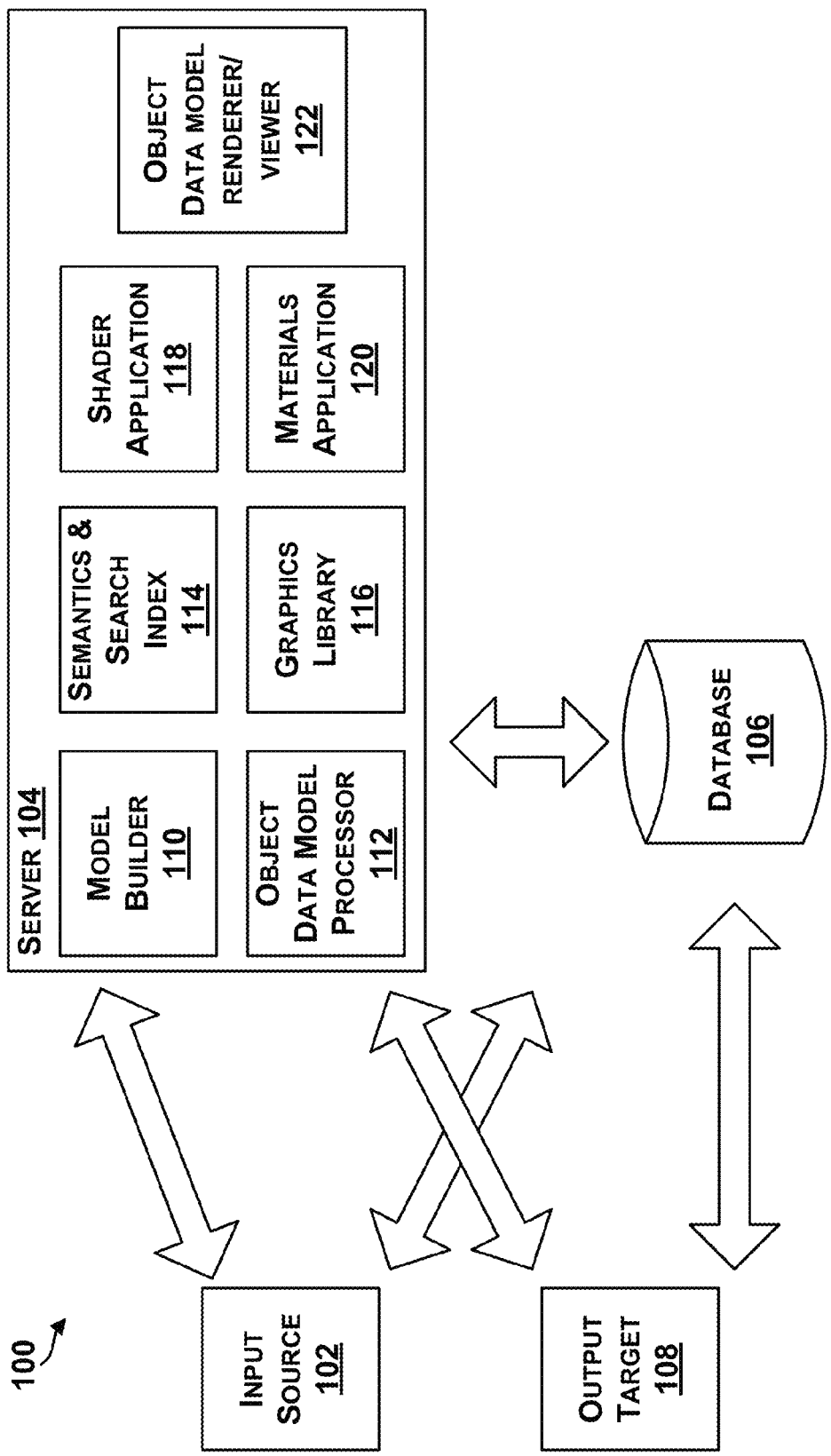
FIG. 1 illustrates an example system for object data modeling, in accordance with an embodiment.

Referring now to the figures, FIG. 1 illustrates an example system 100 for object data modeling, in accordance with an embodiment. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no UV (coordinate system of a 2D texture space) unwrapping to generate a mesh (D) with UV unwrapping but no colors. As an example, for a single output texture pixel of an image processing may include, for a given point in UV determine a triangle in the mesh's UV mapping D, and using triangle-local coordinates, move to an associated 3D point on the mesh. A bidirectional ray may be cast along the triangle's normal to intersect with the mesh H, and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
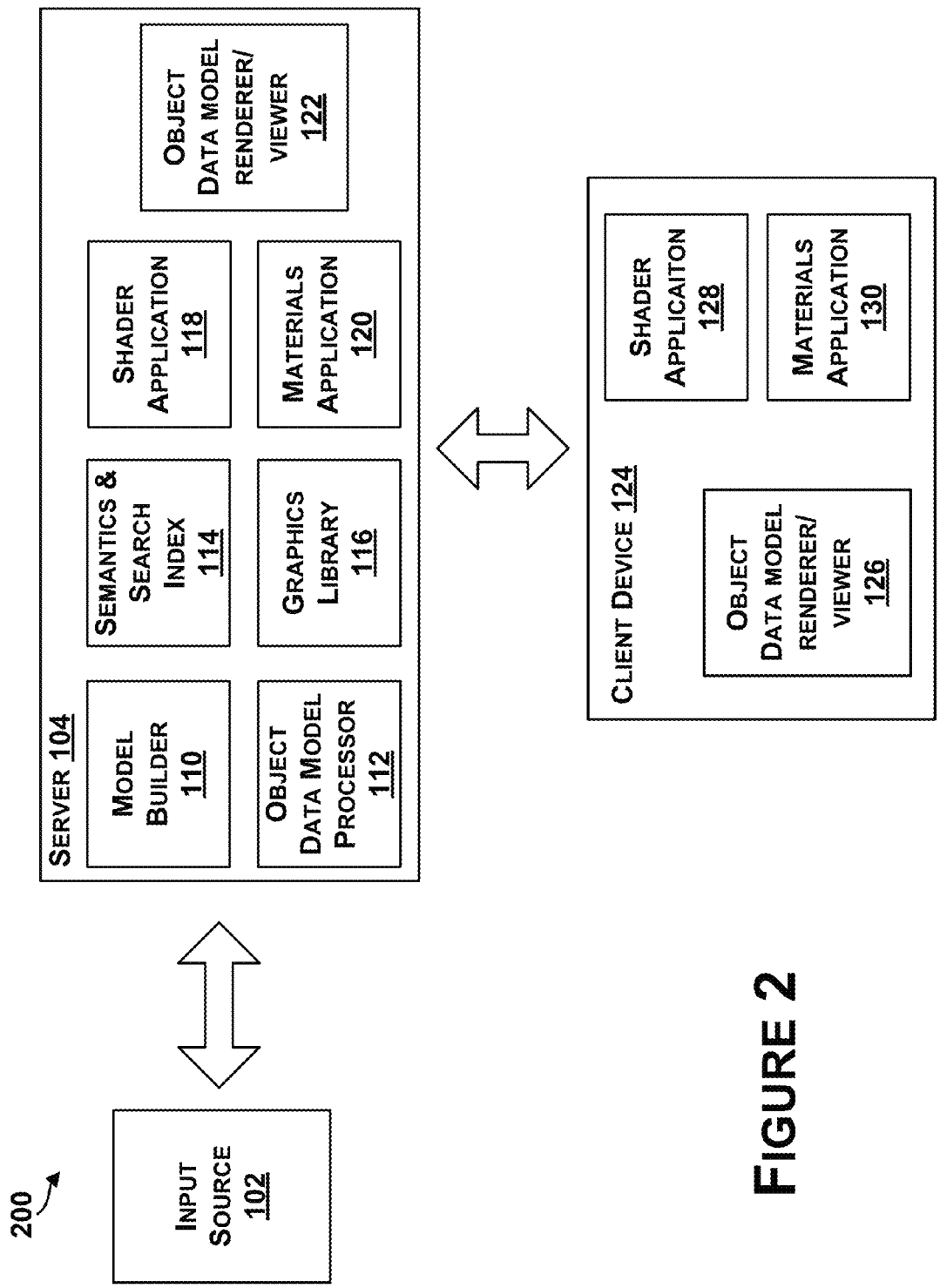
FIG. 2 illustrates another example system for object data modeling, in accordance with an embodiment.

FIG. 2 illustrates another example system 200 for object data modeling, in accordance with an embodiment. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

As described, in some examples, the 3D object data model may include various forms of data, such as raw image data captured, mesh data, processed data, etc. Data of the 3D object data model may be encoded and compressed so as to store information related to 3D geometry of an object associated with information related to appearance of the object for transmission and display within a web browser or application on a device.

In one example, data of the 3D object data model may be compressed by initially encoding a triangle mesh representing the 3D object as a list including a plurality of vertices and a plurality of indices. Each vertex in the list may have several arbitrary parameters associated with the vertex, including, but not limited to, position, surface normal, and texture coordinates. The triangle indices may be stored in a 16-bit unsigned integer format and vertex attributes may be stored in a 32-bit floating point format. The 32-bit floating point format vertex attributes may be reduced to 15-bits. In instances in which compressed data is for a version of a web browser or application that does not have the ability to decompress dictionary encoded data, a delta compression may be used to store differences between the triangle indices and vertex attributes, either in an array of structures layout or a transposed layout. After delta compression, post-delta data may be ZigZag encoded (e.g., using open-source Protocol Buffer library available from Google Inc.). Encoding may follow the format ZigZag(x): (x<<1)^(X>>15) with a corresponding decoding (during decompression) to follow the format UnZigZag(x): (x>>1)^(-(x & 1)). ZigZag encoding may be followed by multi-byte character encoding using UTF-8 encoding. Finally, the UTF-8 encoded data may be compressed using GNU Gzip or bzip2 to generate a compressed 3D object data model file.

The compressed copy of the 3D object data model file may be stored in a database, such as the database 106 in FIG. 1, in the server 104, or on the client device 124, for example. In some examples, the compressed 3D object data model file may be provided by the server 104 to the client device 124 in response to a request from the client device 124. If using a web browser to view the 3D object data model file, the client device 124 may decompress the compressed 3D object data model file according to Java instructions provided in the object browser web page. A local copy of the object browser web page and a local copy of the uncompressed, searchable data of the 3D object data model file can be stored in local memory of the client device 124. The client device 124 may display exemplary screenshots of an initial default view of a 3D object, based on the searchable data of the 3D object data model file loaded in the web browser.

In some examples, the 3D object data file includes information as to geometry of an object sorted by material and divided into portions to be loaded as fragments and reassembled in portions by the client device. As one example, for a mobile phone comprising multiple parts, each part may be rendered using a separate or distinct shader for each material. Thus, the 3D object data file may be divided into multiple portions and compressed as described above to retain all portions. The client device may receive the compressed 3D object data file, decompress the file, and reassemble the portions of the object one-by-one by loading each fragment of the file, streaming file requests for each shader, and reassembling an image of the object.

Figure 3:
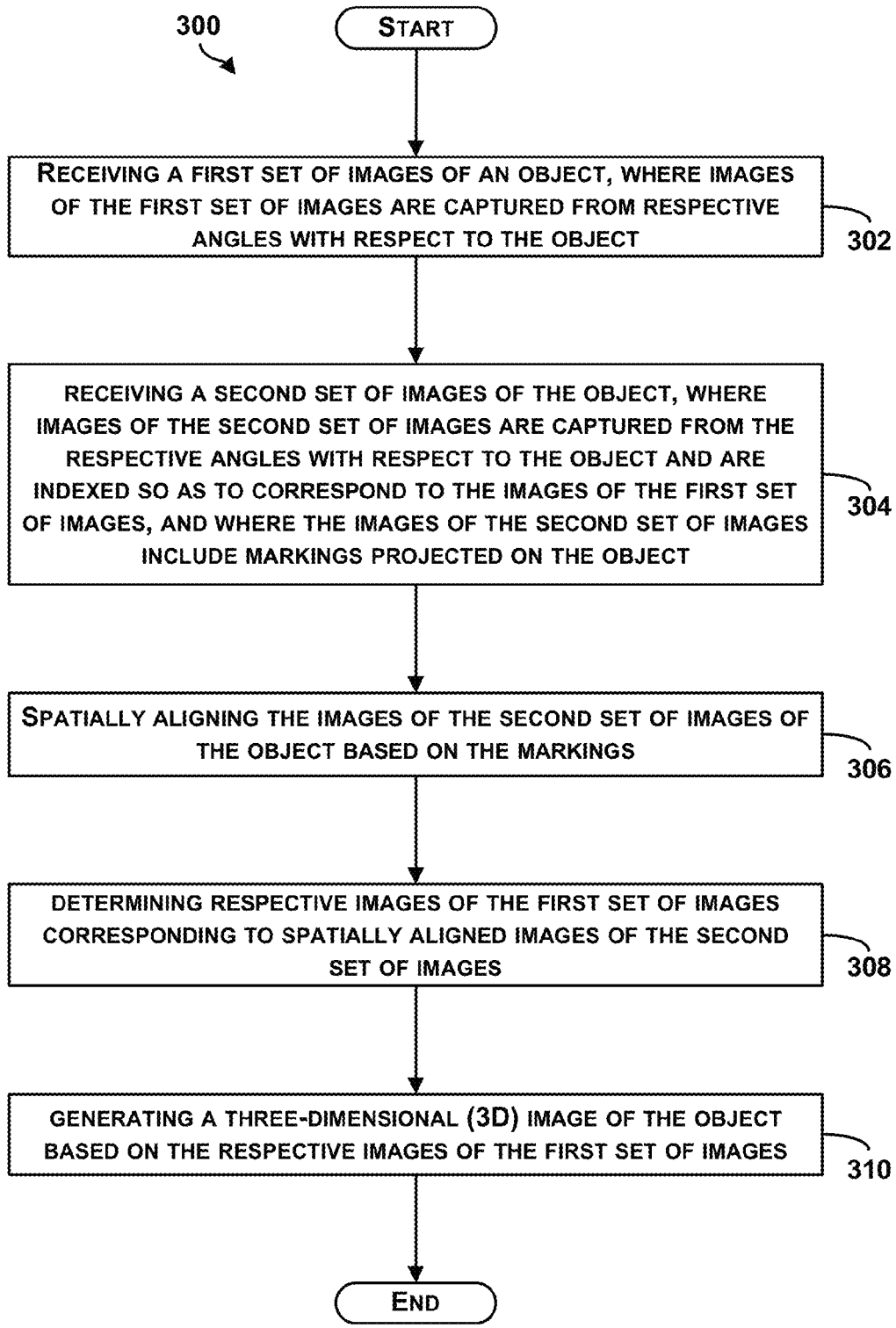
FIG. 3 illustrates a flowchart of an example method for image marking and three-dimensional (3D) image generation, in accordance with an embodiment.

As described above, the systems 100 or 200 may be used to acquire data of an object, process the data to generate a 3D object data model, and render the 3D object data model for display. FIG. 3 illustrates a flowchart of an example method 300 for image marking and 3D image generation, in accordance with an embodiment. The method 300 shown in FIG. 3 presents an embodiment of a method that could be used by the systems 100 or 200 of FIGS. 1-2, for example.

The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 300 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving a first set of images of an object, where images of the first set of images are captured from respective angles with respect to the object. A computing device may be configured to receive a first set of images of an object. The object can be any three-dimensional (3D) object (e.g., a bag, a shoe, a phone, a statue, etc.). A camera may be configured to capture images of the first set of images of the object from different angles. For example, the camera may be rotated through a 360° rotation around the object to capture images of the object from different angles.

Figure 4A:
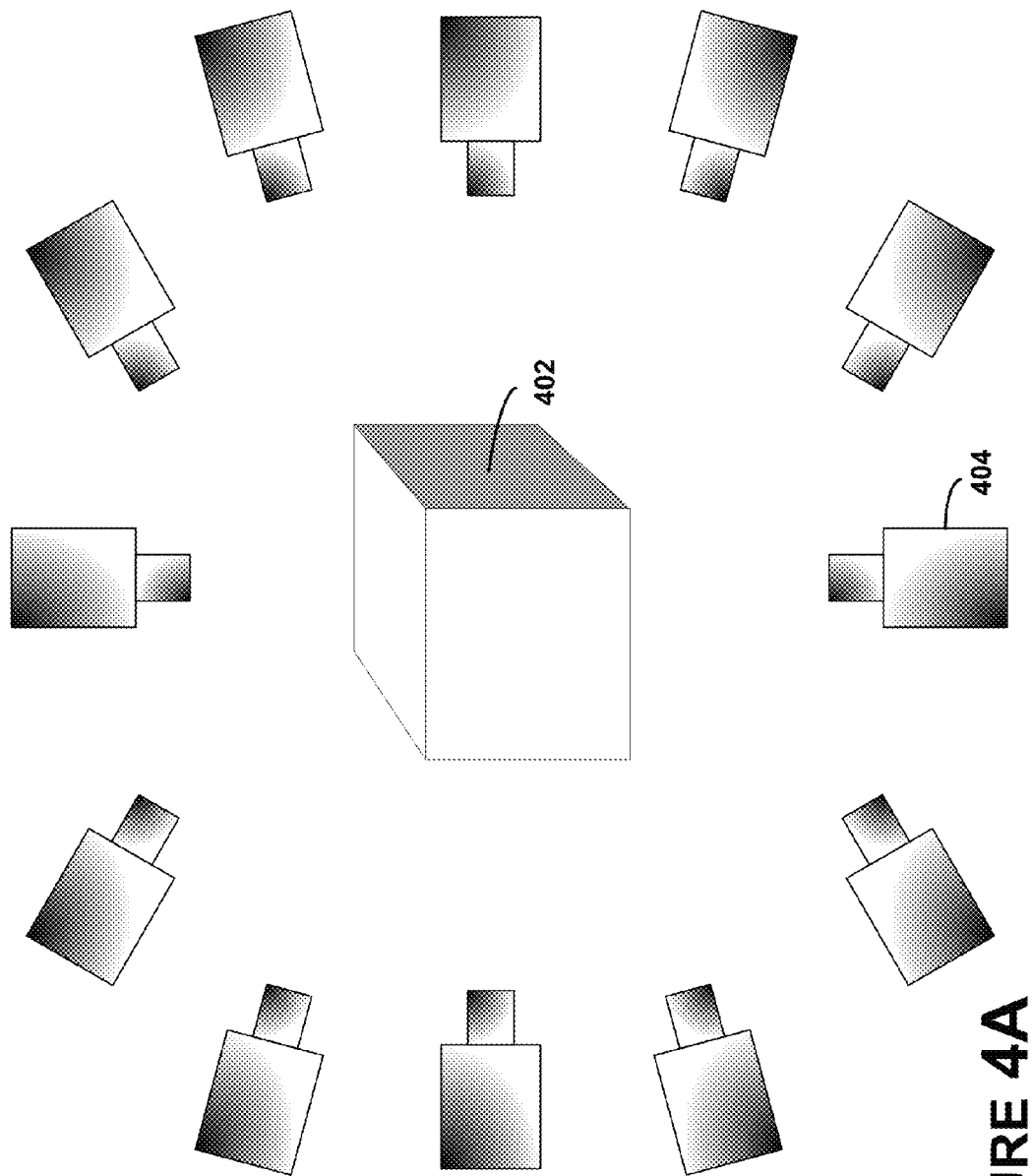
FIG. 4A illustrates an object and a camera that is rotated a 360° rotation around the object to capture images of the object, in accordance with an embodiment.

FIG. 4A illustrates an object 402 and a camera 404 that is rotated using a 360° rotation around the object 402 to capture images of the object 402, in accordance with an embodiment. The object 402 may represent any 3D object. The camera 404 is shown in FIG. 4A at different angles with respect to the object 402 and may be configured to capture the first set of images of the object 402. The first set of images may include images taken at different elevation as well as different angles. The number of angles may vary based on complexity of the object 402, for example. Images from fewer angles may be captured for a symmetric object, for example, than for a more complex object that is not symmetric. In addition, various lighting or backgrounds may be applied to the object, and images may be captured depicting the variations.

In another example, the camera 404 may be fixed, while the object 402 may be rotated in front of the camera 404 such that the camera 404 may capture images from different angles with respect to the object 402. In yet another example, the object 402 may be rotated at a given elevation for the camera 404 to capture a given set of images, then elevation may be changed and the object 402 is rotated again for the camera 404 to capture another set of images. This process may be repeated several times depending on complexity and details of the object 402.

Referring back to FIG. 3, at block 304, the method 300 includes receiving a second set of images, where images of the second set of images are captured from the respective angles with respect to the object and are indexed so as to correspond to the images of the first set of images, and where the images of the second set of images include markings projected on the object. In some examples, the computing device may be coupled to or configured to control a light source that can project markings on the object. The markings for example, may depict a pattern made of light emitted from the light source. The pattern may be simple (e.g., dots tracing a curve), or complex (e.g., a flower). The light source may generally be an electromagnetic radiation source. Light source and electromagnetic radiation source are used interchangeably herein. The electromagnetic radiation source may be configured to project a light beam of any wavelength, visible or invisible. For example, the electromagnetic radiation source may be configured to project visible light such as laser beams with different colors and may additionally or alternately be configured to project invisible light such as infrared light. Other types of markings may be used as well. In an example, the light source may be activated to project the markings on the object and may be deactivated to remove the markings. The markings may be non-destructive to the object.

A camera may be configured to and capable of capturing the images of the second set of images including the markings projected by the electromagnetic radiation source. For example, if the electromagnetic radiation source projects invisible infrared light patterns on the object, the camera configured to capture the second set of images may be an infrared camera capable of capturing images of the object with the infrared light markings.

In an example, the same camera used to capture the first set of images may be configured to capture the second set of images. In some examples, a first camera may be configured to capture the first set of images and a second camera may be configured to capture the second set of images. In these examples, the first camera and second camera may be configured to differ with respect to a given imaging parameter. For example, the first camera may be configured to capture higher resolution images to capture details (e.g., colors, texture, etc.) of the object, while the second camera may be configured to capture lower resolution images of the object. Other examples of imaging parameters that can be configured differently between the first camera and the second camera may include aperture, focal depth, etc.

Image resolution refers to details that an image holds. Higher resolution means more image detail. Image resolution can be measured in various ways. Resolution quantifies how close lines can be to each other and still be visibly resolved. Resolution units can be tied to physical sizes (e.g. lines per mm, lines per inch), to an overall size of a picture (lines per picture height), or to angular subtenant. Line pairs may be used instead of lines in some examples. A line pair comprises a dark line and an adjacent light line. A line may either be a dark line or a light line. For instance, a resolution of 10 lines per millimeter means 5 dark lines alternating with 5 light lines, or 5 line pairs per millimeter (5 LP/mm). In some examples, image resolution refers to a pixel count in an image, which may be specified as number of megapixels, and can be calculated by multiplying pixel columns by pixel rows and dividing by one million. Other conventions include describing pixels per length unit or pixels per area unit, such as pixels per inch or per square inch. Thus, a higher resolution image may have a higher pixel count (i.e., a larger number of pixels) than a lower resolution image.

If a given camera is used to capture both the first set of images and the second set of images, the given camera may be configured for given imaging parameter(s) to capture the first set of images, then the imaging parameter(s) may be adjusted before capturing the second set of images, for example.

In an example, the electromagnetic radiation source may be separate from the camera capturing the images of the second set of images. In another example, the electromagnetic radiation source may be coupled to the camera capturing the second set of images and the camera may be configured to activate the electromagnetic radiation source before capturing the images of the second set of images.

In one example, the images of the second set of images may be captured from same angles and/or elevations as the images of the first set of images. In other examples, the images of the second set of images may be captured from different angles and/or elevations than the images of the first set of images.

The images of the second set of images may be indexed to correspond to the images of the first set of images. In an example, each image of the second set of image may correspond to a respective image of the first set of images. For example, if the images of the second set of images are captured from the same angles as the images of the first set of images, then a given image of the second set of images captured from a given angle is indexed to correspond to a respective image of the first set of images captured from the given angle. Other correspondence arrangements are possible.

Figure 4B:
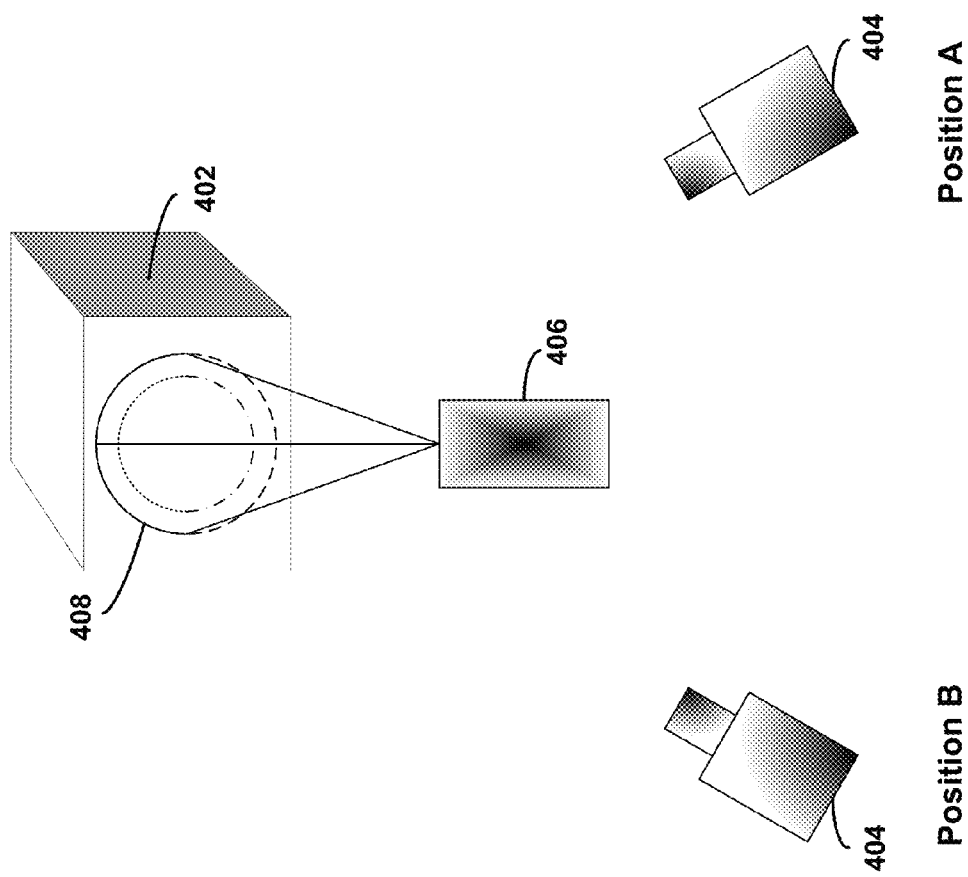
FIG. 4B illustrates an example light source projecting a pattern of markings on the object, in accordance with an embodiment.

FIG. 4B illustrates a projector or light source 406 projecting a pattern 408 of markings on the object 402, in accordance with an embodiment. The camera 404 is shown at two positions, position A and position B for illustration. In an example, the camera 404 may be at position A and may be configured to capture a respective image of the first set of images, then the light source 406 may be activated and the camera 404, while still at position A, may be configured to capture a given image of the second set of images. The camera 404 may be moved to position B, and same sequence of capturing an image of the first set of images, projecting markings on the object, and capturing another image of the second set of images may be repeated, for example. In another example, a different camera may be configured to capture the second set of images than a given camera configured to capture the first set of images; however, in FIG. 4B both are referred to as the camera 404.

In an example, the light source 406 may be rotated with the camera 404 capturing the second set of images. In another example, the light source 406 may be fixed relative to the object while the camera 404 may be rotated from position A to position B. In other examples, the object 402 may be rotated, while the light source 406 and/or the camera 404 may be fixed. Other arrangements are possible. Different arrangements for the projector or light source 406, the camera 404, and object 102 are disclosed in U.S. provisional patent application Ser. No. 61/673,765, filed on Jul. 20, 2012, and entitled "Systems and Methods for Image Acquisition," which is herein incorporated by reference as if fully set forth in this description.

The pattern 408 is shown as two concentric circles for illustration only. Any other pattern is possible. Multiple patterns can be projected on the object. In an example, as the light source 406 (or the object 402) is rotated, patterns may be projected on substantially all portions of the object 402, while the camera 404 may be capturing the images of the second set of images. The pattern 408 may include multiple colors, for example.

Figure 4C:
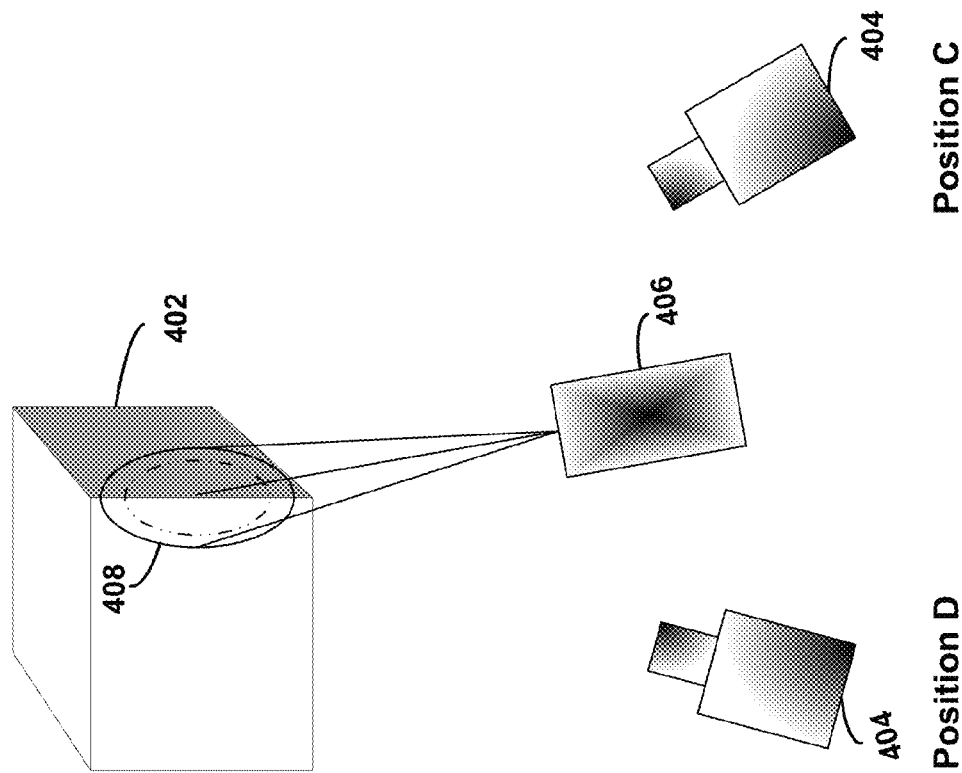
FIG. 4C illustrates the example light source at a different position projecting the pattern of markings the object, in accordance with an embodiment.

FIG. 4C illustrates the light source 406 at a different position projecting the pattern 408 on the object 402, in accordance with an embodiment. In FIG. 4C, the light source 406 is shown projecting the pattern around an edge of the object 402, and the camera 404 is shown at two positions, position C and position D, for illustration only. The light source 406 may be rotated to the same positions as the camera 404 and may be configured to project the pattern 408 before the camera 404 captures the images of the second set of images. In an example, as the light source 406 (or the object 402) may be rotated, the light source 406 may be configured to project different patterns on the object 402.

Referring back to FIG. 3, at block 306, the method 300 includes spatially aligning the images of the second set of images of the object based on the markings. As described at block 304, the computing device may be configured to receive the images of the second set of images that include portions of the pattern projected by the light source (e.g., the light source 406 in FIGS. 4A-4C). The computing device may be configured to spatially align the images of the second set of images based on the pattern (e.g., the pattern 408) of markings projected on the object (e.g., the object 402).

As an example, the computing device may be configured to match portions of the pattern in each image of the second set of images to corresponding portions of the pattern in given images of the second set of images that are spatially neighboring, based on respective capture angles/locations, to that image so as to spatially align the images of the second set of images. In some examples, the computing device may be configured to spatially align the images using direct alignment methods to search for image alignments that minimize a sum of absolute difference between overlapping pixels including given portions of the pattern projected on the object.

In another example, the computing device may be configured to determine a unique set of visual features in the pattern by using a feature detection algorithm. Feature detection may include processing an image to search for unique features represented as a two-dimensional array of pixel values or resolution-independent shape primitives (e.g., a T shape, a cross X, a dot, etc.). The pattern may include at least three non-collinear features that can define a unique plane. The computing device may be configured to detect the three features in two separate images captured with the same pattern projected on the object; and may compute an alignment of the two images spatially using the three features that define the plane.

In an example, spatially aligning the images of the second set of images may include preprocessing the images of the second set of images. The images of the second set of images may, for example, be calibrated to minimize differences between ideal lens models and camera-lens combination, optical defects such as distortions, and differences in camera response. As another example, colors may be adjusted between images to compensate for exposure differences. In examples where camera motion while capturing the images of the second set of images may be relevant, high dynamic range merging may be performed along with motion compensation. Those skilled in the art will appreciate that other algorithms and arrangements and other elements can be used for calibrating images.

In some examples, the object or an environment around the object and affecting the object may be dynamic (e.g., lighting around the object may change over a course of capturing images of the object). In these examples, the computing device may be configured to spatially as well as temporally align the images of the second set of images to account for changes in or around the object. In these examples, the images of the first set of images and the images of the second set of images may be identified and/or indexed by a time at which a given image is captured.

In an example, the computing device may be configured to analyze differences in relationships between features of the pattern of markings projected on the object (angle, distance, etc.), and may be configured to identify a 3D position of each feature, as well as a position and an angle at which each image of the second set of images may have been captured.

As described above, as an example, the images of the second set of images may be of a lower resolution as compared to the images of the first set of images. The computing device may be configured to use such lower resolution images for alignment as opposed to using high resolution images of the first set of images, to increase computational efficiency of the computing device while performing image alignment.

FIG. 5A illustrates an example of two images 502 and 504 of the second set of images including the markings and received at the computing device, in accordance with an embodiment. As depicted in FIG. 5A, the images 502 and 504 include portions 506A and 506B, respectively, of the pattern 408 shown in FIG. 4A. As an example, the image 502 may be captured when the camera 404 is at position A as shown in FIG. 4A, while the image 504 may be captured when the camera 404 is at position B. The images 502 and 504 may be identified by the computing device as spatially neighboring images.

As an example, the computing device may be configured to spatially align the images 502 and 504 of the second set of images by matching the portion 506A of the pattern included in the image 502 to the portion 506B of the pattern included in the image 504.

In an example, the computing device may be configured to go through several iterations to correctly align the images of the second set of images based on the markings FIGS. 5B-5D illustrate example iterations of image alignment, in accordance with an embodiment. For example, FIGS. 5B and 5C illustrate example incorrect alignment iterations that the computing device may go through before determining a correct alignment depicted in FIG. 5D.

In an example, the pattern may be projected such that computational efficiency of the computing device aligning the images of the second set of images may be increased. For example, the upper half of either circles of the pattern 408 has a different line type than the lower half of the circles (e.g., the upper half of the outer circle is a solid line, while the lower half of the outer circle is made of a dashed line type). The computing device may be configured to recognize, using image recognition techniques known in the art, the different line types. Accordingly, the computing device may be configured to recognize mismatches in line types, align the images 502 and 504 quicker and more efficiently, for example, and may reduce number of, avoid, or eliminate incorrect alignment iterations.

Figure 5E:
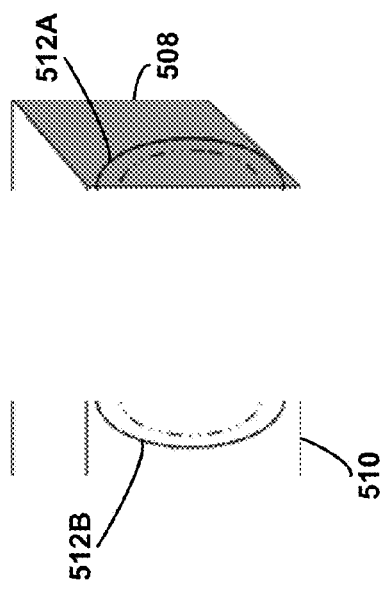
FIG. 5E illustrates an example of two images of two intersecting sides of the object including the markings, in accordance with an embodiment.

Similarly, FIG. 5E illustrates an example of two images 508 and 510 of two intersecting sides of the object including the markings, in accordance with an embodiment. As depicted in FIG. 5E, the images 508 and 510 include portions 512A and 512B, respectively, of the pattern 408 shown in FIG. 4C, for example. As an example, the image 508 may be captured when the camera 404 is at position C, while the image 510 may be captured when the camera 404 is at position D. The images 508 and 510 may be identified by the computing device as spatially neighboring images.

Figure 5F:
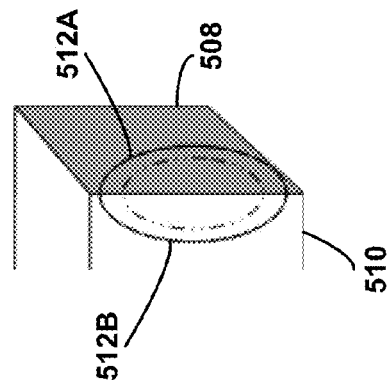
FIG. 5F illustrates alignment of two images of two intersecting sides of the object based on the markings projected on the object, in accordance with an embodiment.

FIG. 5F illustrates spatial alignment of the two images 508 and 510 of the two intersecting sides of the object based on the markings projected on the object, in accordance with an embodiment. For example, the computing device may be configured to match the pattern portions 512A and 512B to spatially align the images 508 and 510 as shown in FIG. 5F.

Spatial alignment illustrated in FIGS. 5A-5F may be performed for all or a subset of the images of the second set of images captured. Although FIGS. 5A-5F illustrate aligning two images, in other examples more images can be aligned at a given time by the computing device to match corresponding portions of the pattern projected on the object.

Using different line types to facilitate spatial alignment is used herein for illustration only. Other distinguishing features of the pattern can be used. For example, more than one color may be used to project the pattern. In this example, the computing device may be configured to recognize the different colors in the pattern projected on the object and included the images of the second set of images and may spatially align the images of the second set of images accordingly, i.e., the computing device may be configured to match portions of the pattern in a given image of the second set of images to corresponding portions in spatially neighboring images of the second set of images based at least in part on matching the more than one color of the pattern.

As another example, the pattern may include distinctive features which can be determined by local feature detection algorithms such as SIFT (Scale Invariant Feature Transform), SURF (Speeded Up Robust Feature) or ORB (Oriented FAST and Rotated BRIEF). These algorithms may identify distinctive points on an image that can be recognized reliably as the orientation or distance to an object changes. The pattern may be designed to include a plurality of these features in a known relationship, such as a triangle cluster or a tessellation of triangles in a more complex graph structure. For example, the computing device may be configured to use the features of a given triangular feature cluster to robustly match the orientation and plane of a given triangle in one image to another image. Using multiple triangles may provide robustness in the case of occlusion.

Referring back to FIG. 3, at block 308, the method 300 includes determining respective images of the first set of images corresponding to aligned images of the second set of images. As described at block 304 of the method 300, the images of the second set of images are indexed so as to correspond to the images of the first set of images. In an example, there may be a one to one correspondence between the images of the first set of images and the images of the second set of images, i.e., each image of the second set of images may correspond to a respective image of the first set of images. The computing device may, based on indexing of the images of the second set of images to the images of the first set of images, be configured to determine respective images from the first set of images that correspond to spatially aligned images of the second set of images.

At block 310, the method 300 includes generating a 3D image of the object from the respective images of the first set of images. As described above, the images of the first set of images may be high resolution images to capture details (e.g., texture, colors, etc.) of the object. The computing device may be configured to create a 3D image and/or 3D model of the object using the respective images of the first set of images determined to correspond to the aligned images of the second set of images such that a user of the 3D model of the object may be able to view fine details of the object.

Creating the 3D image or model of the object may involve estimating 3D coordinates of points on the object. The coordinates may be determined by measurements made in the determined images of the first set of images. Common points may be identified on each image. A line of sight (or ray) can be constructed from a camera location to a point on the object. Intersection of these rays (triangulation) may determine a 3D location or coordinates of the point. Identified structures can be used to generate 3D models that can be viewed, for example, using 3D Computer Aided Design (CAD) tools. In one example, a 3D geometric model in the form of a triangular surface mesh may be generated. In another example, the model is in voxels and a marching cubes algorithm may be applied to convert the voxels into a mesh, which can undergo a smoothing operation to reduce jaggedness on surfaces of the 3D model caused by conversion by the marching cubes algorithm. An example smoothing operation may move individual triangle vertices to positions representing averages of connected neighborhood vertices to reduce angles between triangles in the mesh.

In one example, 3D image/model generation may further include application of a decimation operation to the smoothed mesh to eliminate data points, which may improve processing speed. After the smoothing and decimation operations have been performed, an error value may be calculated based on differences between a resulting mesh and an original mesh or original data, and the error may be compared to an acceptable threshold value. The smoothing and decimation operations may be applied to the mesh once again based on a comparison of the error to the acceptable value. Last set of mesh data that satisfies the threshold may be stored as the 3D model.

The triangles may form a connected graph. In this manner, two nodes in a graph may be connected if there is a sequence of edges that forms a path from one node to the other (ignoring direction of the edges). Connectivity may be an equivalence relation on a graph. For example, if triangle A is connected to triangle B and triangle B is connected to triangle C, then triangle A is connected to triangle C. A set of connected nodes may then be called a patch. A graph may fully be connected if it consists of a single patch. Algorithms may be implemented to use other information about the object that is known a priori (e.g., symmetries). Those skilled in the art will appreciate that other algorithms and arrangements and other elements can be used for generating a 3D image or model for the object.

The computing device may be configured to generate the 3D image or model of the object and may be configured to render the 3D object model for display to create a 3D visualization of the object for the user to view. Using the generated 3D model, the user may be able to view the object from any angle and zoom in and out, for example.

Figure 6:
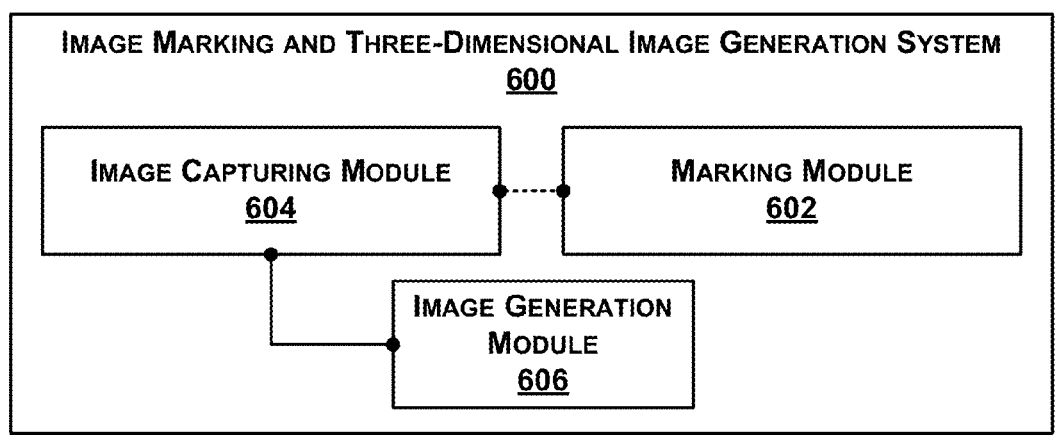
FIG. 6 illustrates an example system for image marking and 3D image generation, in accordance with an embodiment.

FIG. 6 illustrates a system 600 for image marking and 3D image generation, in accordance with an embodiment, that can be used to implement the method 300. The system 600 may include a marking module 602, an image capturing module 604 that may or may not be coupled to the marking module 602, and an image generation module 606 coupled to the image capturing module 604. Components of the system 600 may be configured to work in an interconnected fashion with each other and/or with other components coupled to respective systems.

The marking module 602 may be configured to project, on an object, markings that depict a pattern. The object may be any 3D object. For example, the marking module 602 may include or be coupled to a light source that can project a pattern on the object. The light source may be a type of an electromagnetic radiation source that can project visible and/or invisible light on the object. The electromagnetic radiation source may for example be a laser source capable of emitting laser beams of different colors, for example. The electromagnetic radiation source may be configured to project a simple pattern such as a group of dots or more complex patterns including lines, curves, shapes, etc. The marking module 602 may be configured to activate the light source to project the markings on the object and to deactivate the light source to remove the markings, for example.

The image capturing module 604 coupled to the marking module 602 may be configured to receive images of the object. For example, the image capturing module 604 may include or be coupled to one or more cameras. The camera(s) may be configured to capture images of the object from different angles. For example, the camera(s) may be rotated through a 360° rotation around the object and capture the images of the object from different angles. In one example, the image capturing module 604 may be configured to control a first camera to capture a first set of images of the object. The first set of images may be of a high resolution to capture details of the object. The image capturing module 604 may also be configured to communicate with the marking module 602 to activate the light source and project markings on the object. The image capturing module 604 may further be configured to control a second camera to capture a second set of images of the object while the markings are projected on the object. The second set of images may be of a lower resolution than the first set of images.

In an example, the first camera and the second camera may capture the first set of images and the second set of images from same angles, i.e., the first camera may capture a first image of the object from a given angle, then the markings are projected on the object and the second camera may capture a second image of the object from the given angle. In another example, the first camera and second camera may capture images from different angles. Images of the second set of images may be indexed to correspond to images of the first set of images. For example, a given first image is captured by the first camera from a first given angle and a given second image is captured by the second camera from a second given angle (that may or may not be the same as the first given angle), and the given second image is indexed to correspond to the given first image.

In some examples, one camera may be used to capture both sets of images. In these examples, the camera may capture a first image of the object, then the markings may be projected on the object and the camera may capture a second image of the object that corresponds to the first image but includes the markings. The camera may be set to a higher resolution when capturing the first image, for example.

The image generation module 606 may be in communication with the image capturing module 604 and may be configured to match given portions of the pattern in each image of the second set of images to corresponding portions of the pattern in spatially neighboring images of the second set of images so as to spatially align the images of the second set of images.

As described above, in an example, the images of the second set of images may be of a lower resolution as compared to the images of the first set of images. The image generation module 606 may be configured to use such lower resolution images to for alignment as opposed to using high resolution images of the first set of images, to increase computation efficiency and reduce computational effort by the image generation module 606 while performing image alignment.

The image generation module 606 may also be configured to determine respective images of the first set of images corresponding to spatially aligned images of the second set of images. As described above, the images of the second set of images are indexed so as to correspond to the images of the first set of images. The image generation module 606 may, accordingly, be configured to determine respective images from the first set of images that correspond to spatially aligned images of the second set of images.

The image generation module 606 may further be configured to generate a 3D image and/or 3D model of the object using the respective images of the first set of images determined to correspond to the aligned images of the second set of images.

The image generation module 606 may be configured to generate the 3D image or model of the object and may be configured to render the 3D object model for display to create a 3D visualization of the object for a user to view fine details of the object from any angle and zoom in and out, for example.

One or more of the described functions or components of the system 600 may be divided up into additional functional or physical components, or combined into fewer functional or physical components. In some further examples, additional functional and/or physical components may be added to the examples illustrated by FIG. 6. Still further, any of the marking module 602, the image capturing module 604, and/or the image generation module 606 may include or be provided in the form of a processor (e.g., a microprocessor, a digital signal processor (DSP), etc.) configured to execute program code including one or more instructions for implementing logical functions described herein. The system 600 may further include any type of computer readable medium (non-transitory medium) or memory, for example, such as a storage device including a disk or hard drive, to store the program code. In other examples, the system 600 may be included within other systems.

Figure 7:
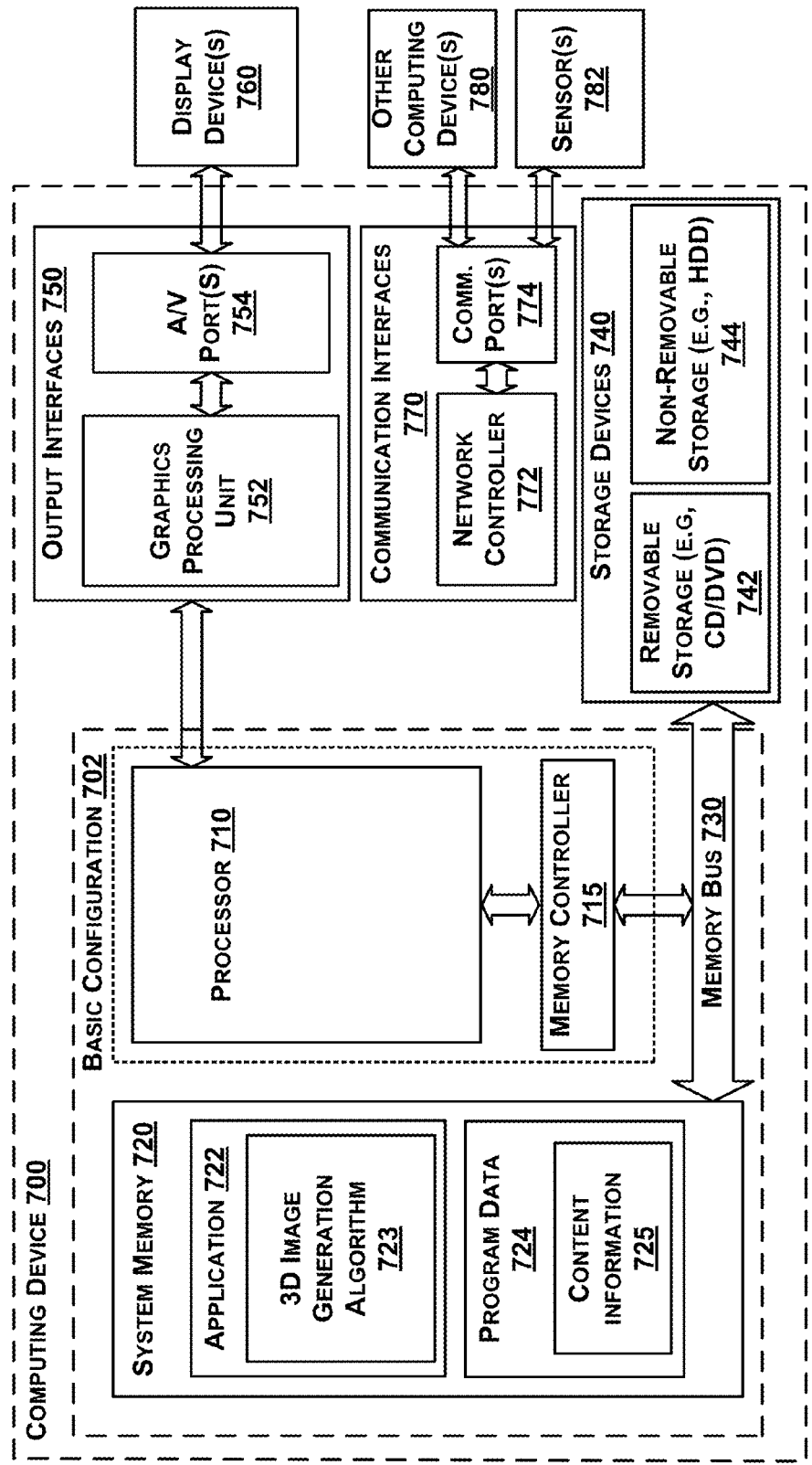
FIG. 7 is a functional block diagram illustrating an example computing device used in a computing system that is arranged in accordance with at least some embodiments described herein.

FIG. 7 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for image marking and three-dimensional (3D) image generation system as described in FIGS. 1-6. In a basic configuration 702, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 may include one or more applications 722, and program data 724. Application 722 may include a 3D image generation algorithm 723 that is arranged to provide inputs to the electronic circuits, in accordance with the present disclosure. Program data 724 may include content information 725 that could be directed to any number of types of data. In some example embodiments, application 722 can be arranged to operate with program data 724 on an operating system.

Computing device 700 can have additional features or functionality, and additional interfaces to facilitate communications between the basic configuration 702 and any devices and interfaces. For example, data storage devices 740 can be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 750 that may include a graphics processing unit 752, which can be configured to communicate to various external devices such as display devices 760 or speakers via one or more A/V ports 754 or a communication interface 770. The communication interface 770 may include a network controller 772, which can be arranged to facilitate communications with one or more other computing devices 780 and one or more sensors 782 over a network communication via one or more communication ports 774. The one or more sensors 782 are shown external to the computing device 700, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product that includes a computer program for executing a computer process on a computing device, arranged according to at least some embodiments presented herein.

In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-7. In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
    receiving, at a computing device, a first set of images of an object, wherein images of the first set of images are captured from respective angles with respect to the object;
    receiving a second set of images of the object, wherein images of the second set of images are captured from the respective angles with respect to the object and are indexed such that each image of the second set of images corresponds to a respective image of the first set of images, wherein the images of the second set of images are captured while a pattern is projected on the object, and wherein the images of the second set of images have a lower resolution than the images of the first set of images;

matching portions of the pattern in each image of the second set of images to corresponding portions of the pattern in spatially neighboring images of the second set of images so as to spatially align the images of the second set of images having the lower resolution;

determining, based on indexing of the images of the second set of images to the images of the first set of images, respective images of the first set of images that correspond to and are captured at the same respective angles as images of the second set of images that are spatially aligned;

replacing the aligned respective second images with the respective images of the first set of images having higher resolution than the aligned respective second images; and generating a three-dimensional (3D) image of the object using the respective images of the first set of images having the higher resolution that replace the spatially aligned images of the second set of images having the lower resolution.

2. The method of claim 1, further comprising projecting the pattern on the object by a light source.

3. The method of claim 2, wherein the light source includes an electromagnetic radiation source that projects the pattern on the object as one or more of (i) a visible light, and (ii) and an invisible light.

4. The method of claim 3, wherein the electromagnetic radiation source is configured to emit laser beams of different colors to project the pattern on the object.

5. The method of claim 2, wherein the light source is fixed from a perspective of the object as a camera rotates relative to the object to capture the images of the second set of images.

6. The method of claim 2, wherein the light source rotates relative to the object as a camera rotates relative to the object to capture the images of the second set of images.

7. The method of claim 1, further comprising activating a light source to project the pattern on the object before capturing the images of the second set of images.

8. The method of claim 1, further comprising:
generating a 3D object data model of the object; and
rendering the 3D object data model of the object for display.

9. A non-transitory computer readable medium having stored thereon instructions executable by a computing device to cause the computing device to perform functions comprising:

receiving a first set of images of an object, wherein images of the first set of images are captured from respective angles with respect to the object;

receiving a second set of images of the object, wherein images of the second set of images are captured from the respective angles with respect to the object and are indexed such that each image of the second set of images corresponds to a respective image of the first set of images, wherein the images of the second set of images are captured while a pattern is projected on the object, and wherein the images of the second set of images have a lower resolution than the images of the first set of images;

matching portions of the pattern in each image of the second set of images to corresponding portions of the pattern in spatially neighboring images of the second set of images so as to spatially align the images of the second set of images having the lower resolution;

determining, based on indexing of the images of the second set of images to the images of the first set of images, respective images of the first set of images that correspond to and are captured at the same respective angles as images of the second set of images that are spatially aligned;

replacing the aligned respective second images having the lower resolution with the respective images of the first set of images having higher resolution than the aligned respective second images; and generating a three-dimensional (3D) image of the object using the respective images of the first set of images having the higher resolution that replace the spatially aligned images of the second set of images having the lower resolution.

10. The non-transitory computer readable medium of claim 9, wherein the pattern includes more than one color, and wherein matching portions of the pattern in each image of the second set of images to corresponding portions in the spatially neighboring images of the second set of images is based at least in part on matching the more than one color of the pattern.

11. The non-transitory computer readable medium of claim 9, wherein the pattern is projected on the object by an electromagnetic radiation source as one or more of (i) a visible light, and (ii) and an invisible light.

12. A system, comprising:
a marking module configured to project on an object markings that depict a pattern;

an image capturing module configured to receive a first set of images of the object, wherein images of the first set of images are captured from respective angles with respect to the object, the image capturing module further configured to receive a second set of images of the object, wherein images of the second set of images are captured from the respective angles with respect to the object and are indexed such that each image of the second set of images corresponds to a respective image of the first set of images, wherein the images of the second set of images are captured while the pattern is projected on the object, and wherein the images of the second set of images have a lower resolution than the images of the first set of images; and an image generation module coupled to the image capturing module and configured to match given portions of the pattern in each image of the second set of images to corresponding portions of the pattern in spatially neighboring images of the second set of images so as to spatially align the images of the second set of images having the lower resolution, the image generation module further configured to determine, based on indexing of the images of the second set of images to the images of the first set of images, respective images of the first set of images that correspond to and are captured at the same respective angles as images of the second set of images that are spatially aligned, and replace the aligned respective second images having the lower resolution with the respective images of the first set of images having higher resolution than the aligned respective second images, and the image generation module further configured to generate a three-dimensional (3D) image of the object using the respective images of the first set of images having the higher resolution that replace the spatially aligned images of the second set of images having the lower resolution.

13. The system of claim 12, wherein the first set of images is captured by a first camera coupled to the image capturing module, and the second set of images is captured by a second camera coupled to the image capturing module, and wherein the second camera is configured to capture lower resolution images than the first camera.

14. The system of claim 13, wherein the pattern is projected on the object by an electromagnetic radiation source as one or more of (i) a visible light, and (ii) and an invisible light, and wherein the second camera is capable of capturing images including the pattern projected by the electromagnetic radiation source on the object.

15. The system of claim 14, wherein the electromagnetic radiation source is coupled to the marking module and includes a laser source.

16. The system of claim 14, wherein the electromagnetic radiation source is coupled to the marking module and is configured to emit laser beams of different colors, and wherein the pattern includes more than one color projected by the electromagnetic radiation source, and wherein the image generation module is configured to match the given portions of the pattern in each image of the second set of images to the corresponding portions of the pattern in the spatially neighboring images based at least in part on matching the more than one color of the pattern.

17. The system of claim 12, wherein the first set of images and the second set of images are captured by a given camera coupled to the image capturing module.

18. The system of claim 17, wherein the given camera is configured to capture images of the higher resolution when capturing the first set of images, and configured to capture images of the lower resolution when capturing the second set of images.

19. The system of claim 17, wherein the given camera includes an electromagnetic radiation source, and wherein the electromagnetic radiation source is configured to project the pattern on the object before capturing images of the second set of images.

20. The system of claim 17, wherein the given camera is configured to be rotated through a 360° rotation around the object to capture the first set of images and the second set of images.

21. The system of claim 12, wherein the image generation module is configured to generate a 3D object data model of the object and to render the 3D object data model of the object for display.

22. A system comprising:
one or more processors; and
memory configured to store instructions, that when executed by the one or more processors, cause the system to perform operations comprising:
receiving a first set of images of an object, wherein images of the first set of images are captured from respective angles with respect to the object;
receiving a second set of images of the object, wherein images of the second set of images are captured from the respective angles with respect to the object and are indexed such that each image of the second set of images corresponds to a respective image of the first set of images, wherein the images of the second set of images are captured while a pattern is projected on the object, and wherein the images of the second set of images have a lower resolution than the images of the first set of images;
matching portions of the pattern in each image of the second set of images to corresponding portions of the pattern in spatially neighboring images of the second set of images so as to spatially align the images of the second set of images having the lower resolution;
determining, based on indexing of the images of the second set of images to the images of the first set of images, respective images of the first set of images that correspond to and are captured at the same respective angles as images of the second set of images that are spatially aligned;
replacing the aligned respective second images having the lower resolution with the respective images of the first set of images having higher resolution than the aligned respective second images; and
generating a three-dimensional (3D) image of the object based on using the respective images of the first set of images having the higher resolution determined to correspond to that replace the spatially aligned images of the second set of images having the lower resolution.

* * * * *